May 27, 1930.　　　J. S. REID　　　1,760,439
CLOSURE STRUCTURE
Filed March 12, 1928
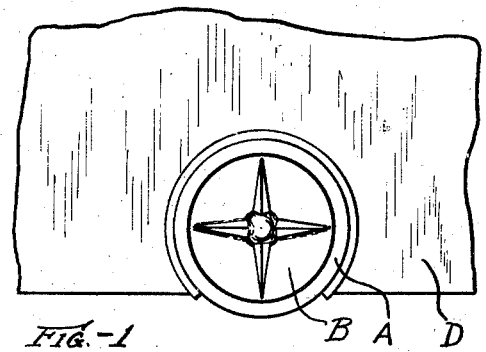
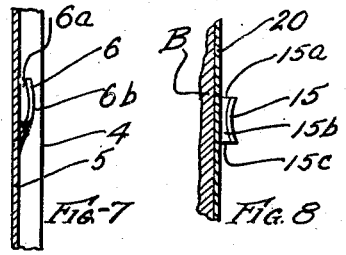
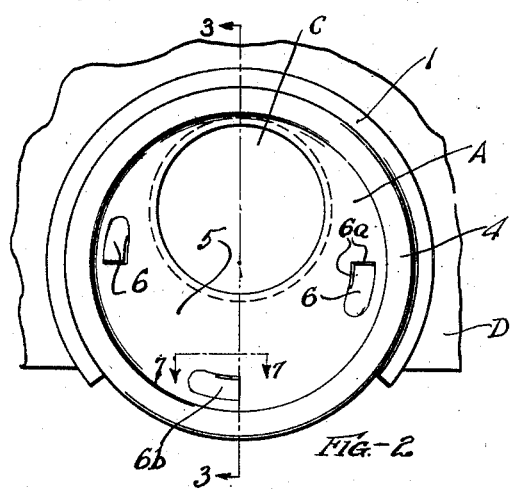
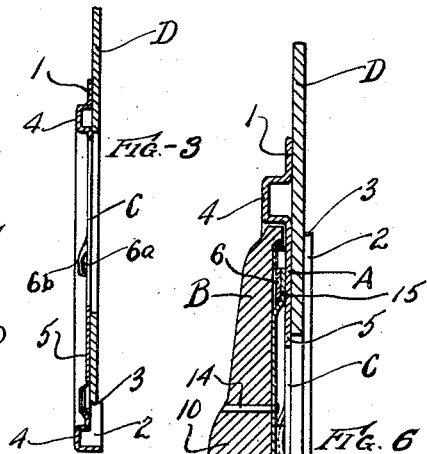
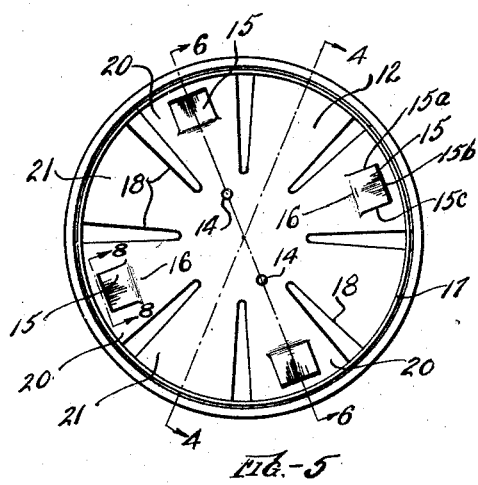
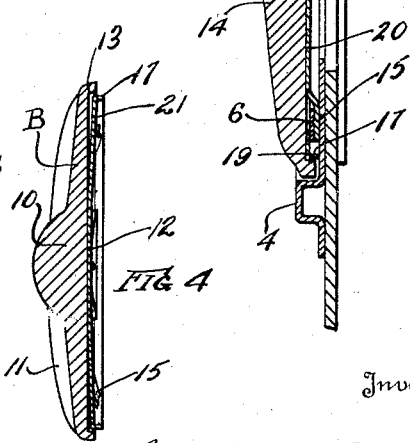
Inventor
James S. Reid
By Brockett & Hyde
Attorneys Patented May 27, 1930

1,760,439

UNITED STATES PATENT OFFICE

JAMES S. REID, OF CLEVELAND, OHIO, ASSIGNOR, BY MESNE ASSIGNMENTS, TO THE EATON AXLE & SPRING COMPANY, OF CLEVELAND, OHIO, A CORPORATION OF OHIO

CLOSURE STRUCTURE

Application filed March 12, 1928. Serial No. 261,060.

This invention relates to quick detachable closures, such as are used on the splash pans of automobiles to cover the opening to the starting shaft, and in other places, such as for closing openings in walls, furniture etc.

The particular object of the present invention is to provide a closure of this kind which is relatively thin and can be accommodated to a place where space is limited, and one in which the closure may be of relatively large size, suitably ornamented and embodying a small number of parts.

In the drawings, which represent one suitable embodiment of the invention, Fig. 1 illustrates an elevation of the device applied to the splash pan of an automobile; Fig. 2 is a similar view, on a larger scale, with the closure omitted and showing the parts attached to or forming part of the splash pan and the opening to be closed; Fig. 3 is a detail sectional elevation on the line 3—3, Fig. 2; Fig. 4 is a similar view of the closure, the section being taken on the line 4—4, Fig. 5; Fig. 5 is a rear elevation of the closure; Fig. 6 is a sectional elevation, on a larger scale, on approximately the line 6—6, Fig. 4, and showing the closure applied to a splash pan. Fig. 7 is a detail sectional view on the line 7—7, Fig. 2, illustrating a locking tongue; and Fig. 8 is a detail sectional view showing another tongue on the line 8—8, Fig. 5.

The closure comprises two members or parts A, B, shown respectively in Figs. 3 and 4, the member or part A having an opening C to be closed, and which part may be attached to or form a part of any suitable device to be closed, such as a tank, receptacle, wall or the like. In the drawings, the member A is suitably attached, preferably permanently, to the splash pan D of an automobile and the opening C is the one through which the starting crank is inserted. Said member to be closed, in this instance, is fastened to the front or exposed surface of the splash pan, because usually the space behind it is limited. It is therefore desirable that any part fastened to the exposed face have as little projection as possible, and that includes the closure itself. As shown, the member A to be closed is of generally circular contour with a peripheral flange 1 which may be riveted, soldered, spot welded or otherwise secured to the splash pan and interrupted and bent inwardly at one point to form an inwardly extending flange 2 the end edges 3 of which meet and abut the lower edge of the splash pan, as in Fig. 3, and assist in locating the device thereon. Inwardly of said flange is an annular bead or raised portion 4 within which the central body portion 5 is flat and is provided with the opening C referred to. Said opening may be central, but is shown as off-center. In the surrounding area member A is provided with the necessary means for cooperative locking relation with the closure, shown as a series of tongues 6 punched or raised out of the body metal and slitted or separated therefrom along two edges, at $6^a$, the remainder of each tongue being merely raised or pressed out of the metal but remaining attached thereto. Viewing one of said tongues from the center of the plate, as in Fig. 7, it may be slightly swelled or raised back of the entrance, as at $6^b$, to form a seat to receive and hold the cooperating locking finger on the closure, as will appear.

The closure member B is also relatively thin. It comprises a generally circular body member 10 which may be made of sheet metal but is shown as a forged or cast member with its outer or exposed face suitably ornamented, if desired, as shown at 11. This ornamentation in many cases is of such form as to enable the closure to be attached in several definite positions or in one particular position in which the design will stand upright. The design, for example, may be of arrow form, the intention being to have it point upwardly, or it might be a human figure, etc. The locking means on the rear of the closure is therefore not only designed to cooperate with the locking tongues 6 but of such form as to enable the closure to be attached thereto in the desired position or positions. In the particular form shown the design 11 is four-pointed, so that the closure may be applied in four different positions. It is provided on its rear face with resilient locking fingers or tongues, which in this case form part of a disc or plate 12 of more or less inherently resilient or spring metal, generally of circular form and lying within a shallow annular flange 13 of the closure. The disc is provided with a central securing portion suitably attached to the body member at or near its center, such as by the rivets 14. Said disc also is provided with a series, four being shown, of radially extending locking arms having outwardly bent fingers or tangues 15, attached to the body of the disc at 16 and sheared therefrom along three edges 15ª, 15ᵇ, 15ᶜ. Viewing one of said tongues endwise or as shown in Fig. 8, it is arched or crowned. In applying the closure B to the member A, three of said tongues enter and become releasably locked to the tongues 6, the remaining tongue 15 being idle. Not only may the metal of the tongues be inherently resilient, but the disc as a whole is formed to provide additional resiliency. As shown, the disc is provided at its periphery with a flange 17 extending continuously around its circumference, and it is also slotted radially at intervals, as at 18. This forms a series of outwardly extending arms on the spring disc, eight such arms being shown, one lying between each two adjacent slots 18. Those arms which carry tongues 15 are sheared away from the annular flange 17 as shown at 19, Fig. 6, while the intervening arms are fast with the annular flange, as shown in Fig. 4. The tongue carrying arms 20 are fastened to the body metal 10, as by brazing, soldering or spot welding, so that they are not resilient or, in other words, they are rigid and do not bend or flex.

The annular flange 17 may be an integral part of the disc or may be a separate ring secured at four places to the outer ends of the intervening flexing arms 21. In either case said intervening arms are bent outwardly from the plane of the disc sufficiently to give them a permanent set, so that when the cap or closure is removed from the device to be closed the ring 17 extends outwardly therefrom.

In applying the closure to the part to be closed it is pushed into its seat within the bead 4 and the flange 17 meets the surface 5. By pushing in on the closure the ring 17 is pushed in toward the face of the closure and the swinging motion of the flexing arms 21 is not only resisted by the resiliency of the metal of said arms, but by more or less flexing or bending of the free spans or arches of ring 17 where they cross the rigid tongue carrying arms 20. By pushing in sufficiently on the closure its tongues 15 are brought back of and into range of the openings 6ª to the tongues 6, and by rotating the closure its tongues may be moved into locking engagement with the tongues on member A, being held there by the resiliency of the metal. Accidental escape is prevented by the arching of the two sets of tongues so that there is a definite interlock when the parts are rotated to final position.

This closure is of very simple and compart form and can be applied in any place where space is limited, particularly depth.

What I claim is:

1. A closure, comprising a body member and a locking member carried thereby, said locking member having a central portion for securement to said body member, a plurality of radially extending locking arms each having locking means, and a plurality of radially extending flexing arms of resilient material, said locking arms and said flexing arms being arranged in alternate relation about said central securing portion.

2. A closure as set forth in claim 1, characterized in that said flexing arms are connected by a continuous ring.

3. A closure as set forth in claim 1, characterized in that said locking arms normally lie against said body member and in that said flexing arms diverge therefrom.

4. A closure, comprising a body member and a locking member carried thereby, said locking member having a central portion for securement to said body member, a plurality of radially extending locking arms each having locking means, and a plurality of radially extending flexing arms of resilient material, said locking arms and said flexing arms being arranged in alternate relation about said central securing portion and said flexing arms being connected at their outer ends by a continuous ring.

5. In a structure of the character described, the combination of a part having an opening to be closed and provided with locking means, a one-piece closing member for said opening provided with a resiliently mounted ring adapted for movement toward and from said member and provided with locking means for cooperation with the locking means of said part.

6. A combination as set forth in claim 5, characterized in that the locking means of said part and said closing member are tongues.

7. In a structure of the character described, the combination of a part having an opening to be closed and provided with locking means, a closing member for said opening having a body portion and a resiliently mounted ring adapted for movement toward and from said body portion, said closing member being also provided with locking means for cooperation with the locking means of said part.

8. A combination as set forth in claim 7, characterized in that the locking means of said closing member are integral with the body portion thereof.

9. In a structure of the character described, the combination of a part provided with an annular bead within which is a plane surface provided with an opening to be closed, tongues raised from said surface within said bead, a closure provided on one face with a shallow recess, and a plurality of locking tongues within said recess for cooperation with the tongues of said part, whereby said closure may be secured to said part in closing position relative to the opening of the latter.

10. A combination as set forth in claim 9, characterized in that said closure is provided within said recess with a plurality of outwardly extending resilient arms which normally resist seating movement of said closure on said part.

11. In a structure of the character described, the combination of a part provided with an annular bead within which is a plane surface provided with an opening to be closed, tongues raised from said surface within said bead, a closure provided on one face with a shallow recess and with a plurality of locking tongues within said recess for cooperation with the tongues of said part, whereby said closure may be secured to said part in closing position relative to the opening of the latter, said closure being also provided with a plurality of outwardly extending resilient arms which normally resist seating movement of said closure on said part and with a resilient ring connecting the outer ends of said arms.

In testimony whereof I hereby affix my signature.

JAMES S. REID.